(12) United States Patent
Shimada et al.

(10) Patent No.: US 7,127,896 B2
(45) Date of Patent: *Oct. 31, 2006

(54) ENGINE COGENERATION SYSTEM

(75) Inventors: Atsushi Shimada, Tokyo (JP);
Kazumasa Ide, Tokyo (JP); Shiro Yamaoka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/265,251

(22) Filed: Nov. 3, 2005

(65) Prior Publication Data

US 2006/0054135 A1   Mar. 16, 2006

Related U.S. Application Data (63) Continuation of application No. 10/787,245, filed on Feb. 27, 2004, now Pat. No. 6,966,185.

(30) Foreign Application Priority Data

Dec. 2, 2003   (JP)   ............... 2003-403426

(51) Int. Cl.
- F02B 73/00 (2006.01)
- F02B 1/12 (2006.01)
- F02B 11/00 (2006.01)
- F02B 1/00 (2006.01)
- F02G 5/04 (2006.01)
- F02G 5/00 (2006.01)
- F25B 49/00 (2006.01)
- H02J 3/46 (2006.01)
- F02P 5/15 (2006.01)
- F02D 43/00 (2006.01)
- F02D 29/06 (2006.01)
- F24H 1/00 (2006.01)

(52) U.S. Cl. ............. 60/698; 60/716; 60/718; 290/2; 290/4 D; 290/4 R (58) Field of Classification Search ............... 60/698, 60/716, 718; 290/1 R, 1 A, 2, 4 R, 4 D
See application file for complete search history.

(56) References Cited

U.S. PATENT DOCUMENTS

| | | | | |
|---|---|---|---|---|
| 4,275,311 A | * | 6/1981 | Agazzone et al. | ............. 290/2 |
| 4,503,337 A | * | 3/1985 | Hafner et al. | ............. 290/4 D |
| 4,527,071 A | * | 7/1985 | Ausiello | ............. 290/4 R |
| 4,752,697 A | * | 6/1988 | Lyons et al. | ............. 290/2 |
| 6,966,185 B1 | * | 11/2005 | Shimada et al. | ............. 60/698 |

FOREIGN PATENT DOCUMENTS

| | | |
|---|---|---|
| JP | 2003-134674 | 5/2003 |

* cited by examiner

*Primary Examiner*—Sheldon J Richter
(74) *Attorney, Agent, or Firm*—Crowell & Moring LLP (57) ABSTRACT

In an engine cogeneration system in which power generators 5 to 8 are driven by a plurality of engines 1 to 4 to thereby supply electric power to power load 22 of a general household, at the same time, heat produced by cooling each of the engines 1 to 4 and heat generated from the exhaust gas are recovered by heat exchangers 18 and 19 to be stored as hot water into a hot-water tank 20 to supply heat to heat load 21 of the general household, the amount of power to be supplied and of the amount of heat to be supplied are controlled by a number of the engines 1 to 4 and the combustion modes of these engines 1 to 4. This engine cogeneration system can follow both the head demand and power demand in a high efficiency.

4 Claims, 13 Drawing Sheets

| Operation Mode | | Power Efficiency | Heat/Power Ratio |
|---|---|---|---|
| MB | Premixing Compression Ignition Combustion Mode | 45 | b = 0.78 |
| MC | Spark Ignition Combustion Mode | 30 | c = 1.67 |
| MD | Ignition Time Retard Combustion Mode | 10 | d = 7.00 |

| Operation Mode | | Power Efficiency | Heat/Power Ratio |
|---|---|---|---|
| MB | Premixing Compression Ignition Combustion Mode | 45 | b = 0.78 |
| MC | Spark Ignition Combustion Mode | 30 | c = 1.67 |
| MD | Ignition Time Retard Combustion Mode | 10 | d = 7.00 |

ENGINE COGENERATION SYSTEM

BACKGROUND OF THE INVENTION

1. Field of the Invention

The present invention relates to a cogeneration apparatus utilizing an internal combustion engine, and particularly to an engine cogeneration system suitably for placing on a residence to supply both electric power and heat for use in a household.

2. Description of the Related Arts

Conventionally, a so-called cogeneration system has been known in which a power generator is driven by an engine (internal combustion engine) utilizing gasoline or municipal gas as fuel to obtain electric power from the power generator and at the same time, exhaust heat from the engine is recovered to be utilized as a heat source. In recent years, a system in which the cogeneration apparatus is placed on a residence to obtain both electric power and heat consumed in the household therefrom, i.e., the engine cogeneration system has been made attracted from the viewpoint of saving energy.

The conventional techniques have been known for example in Japanese Patent Laid-Open Publication No. 2003-134674 that cogeneration apparatuses are placed on a plurality of households, these apparatus are connected to make a network, the variation in power load in each household is dealt with increasing or decreasing driving generators within the network.

In the conventional techniques, no consideration is made to make a network for heat demand, and have a problem in terms of controlling both of heat demands and power demands in each household to follow their variation in each household.

Specifically, in conventional techniques, since network for heat demand is not constructed, the driving of the power generator in each household is to be controlled irreverent to the heat demand in the household, resulting in the problem in terns of control due to making it difficult to follow in both load variations of the heat demand and power demand in an appropriate manner.

Figure 11:
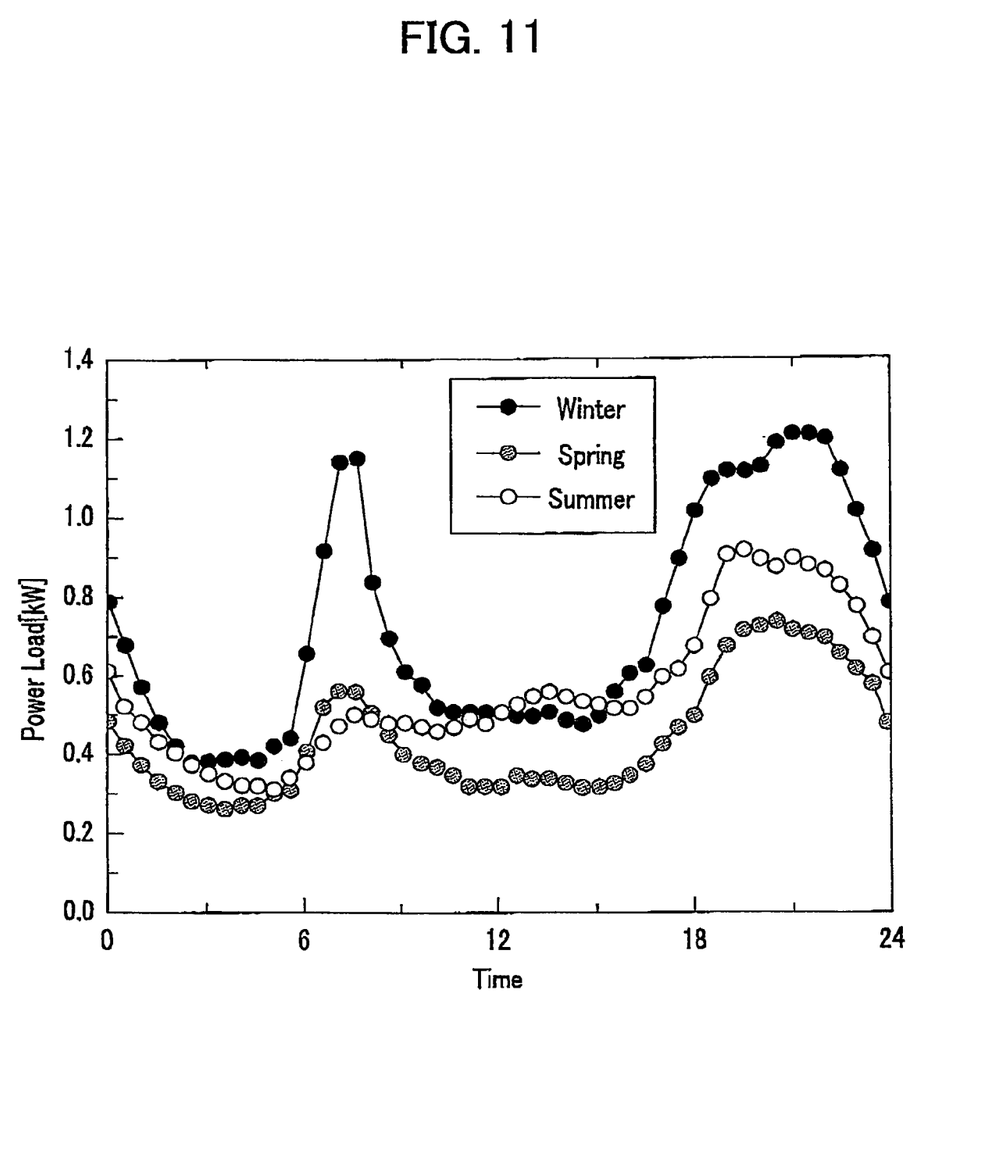
FIG. 11 shows power load [KW] measured at an interval of 30 minutes in each season (summer, spring and autumn) over 1 day (24 hours) in a general household

Here, how the power demand and heat demand are changed within one day (24 hours) in each of seasons will be described. FIG. 11 shows power load [KW] measured at an interval of 30 minutes in each season (summer, spring and winter) over 1 day (24 hours), and FIG. 12 shows heat load [KJ/s] measured at an interval of 30 minutes in each season (summer, spring and autumn) over 1 day (24 hours).

Figure 12:
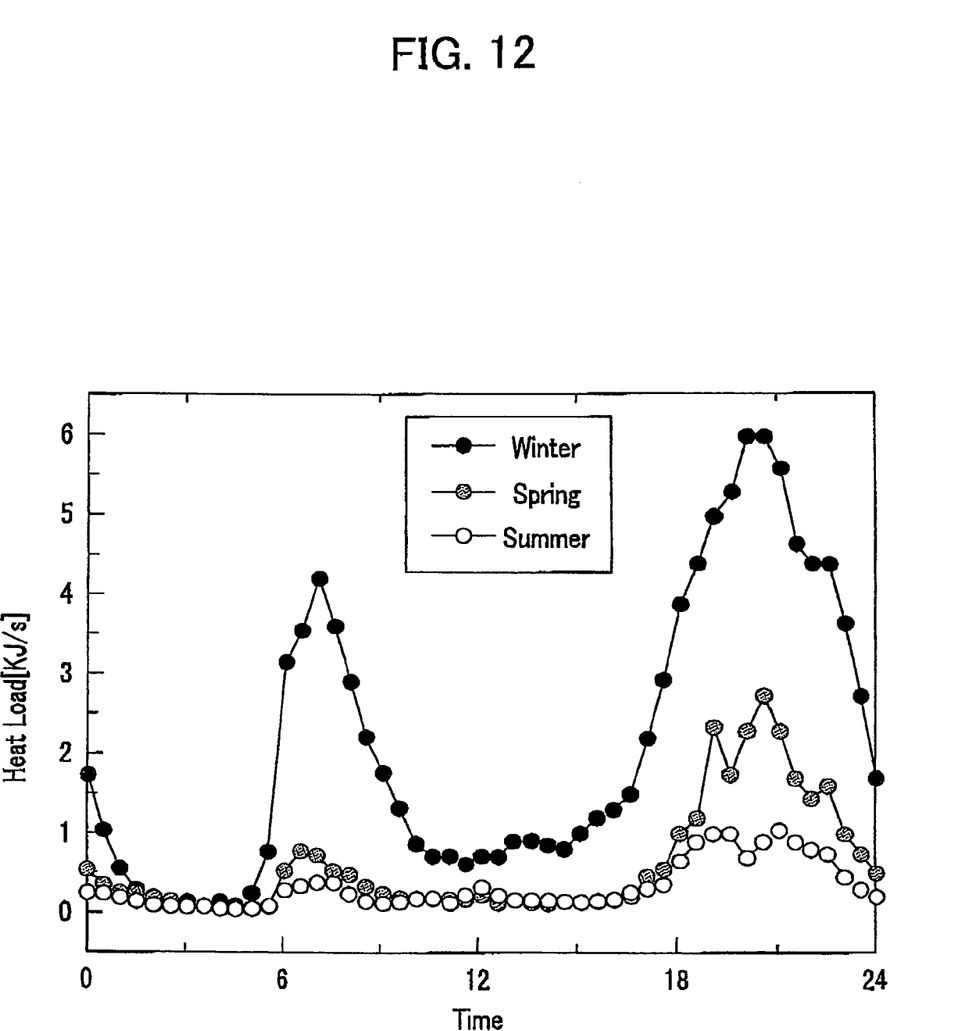
FIG. 12 shows heat load [KJ/s] measured at an interval of 30 minutes in each season (summer, spring and autumn) over 1 day (24 hours) in a general household.

As is clear from FIG. 11 and FIG. 12, it can be understood that both the power generation and heat generation are greatly varied within one day, and particularly, in the case of the heat, it is varied 10 times or more at the maximum. The variations also depend upon the seasons, and there is difference of 10 times or more in winter and summer.

Figure 13:
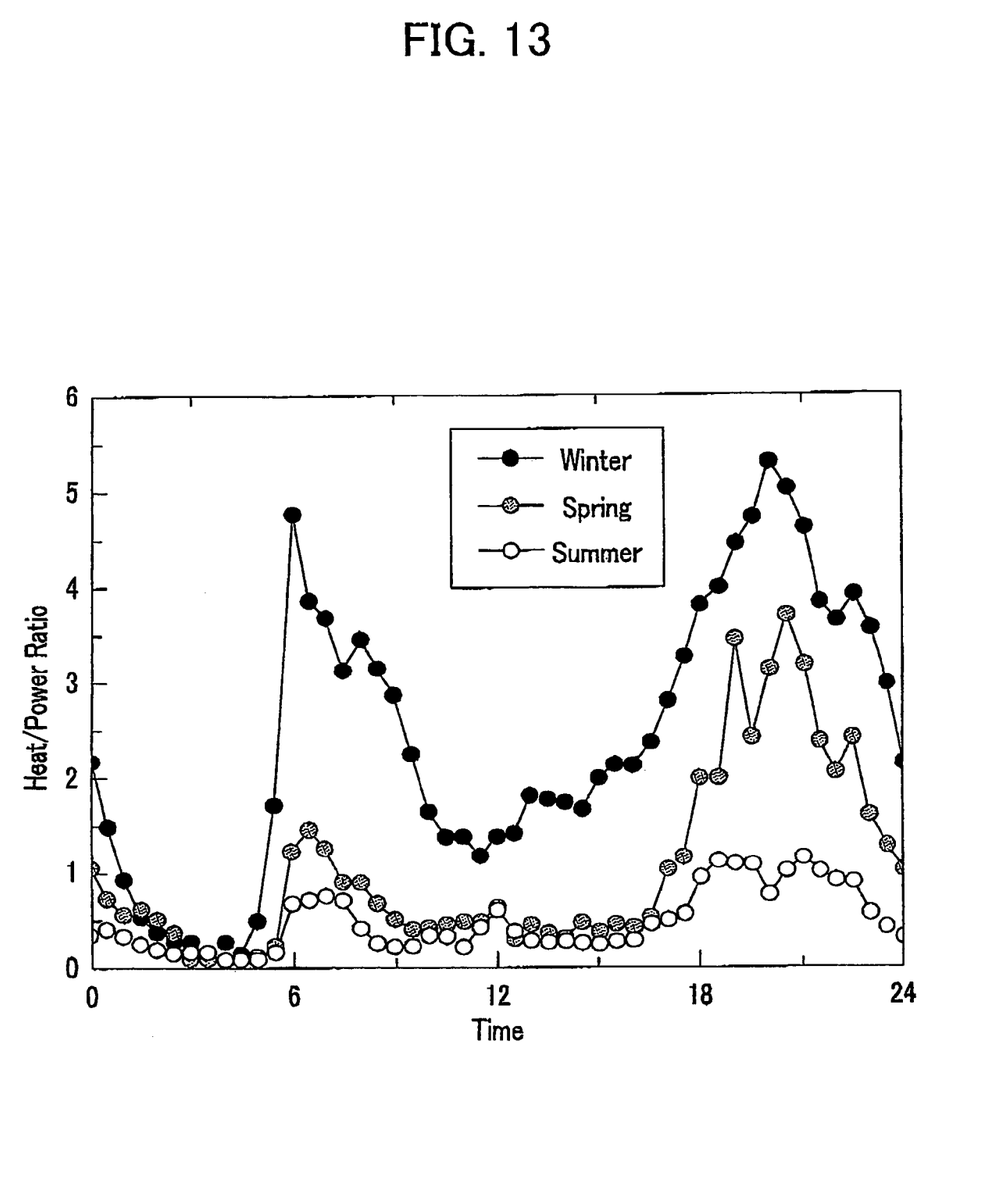
FIG. 13 is characteristic drawing showing the variation in heat-power load ratio in one day in a general household in each season.
Figure 14:
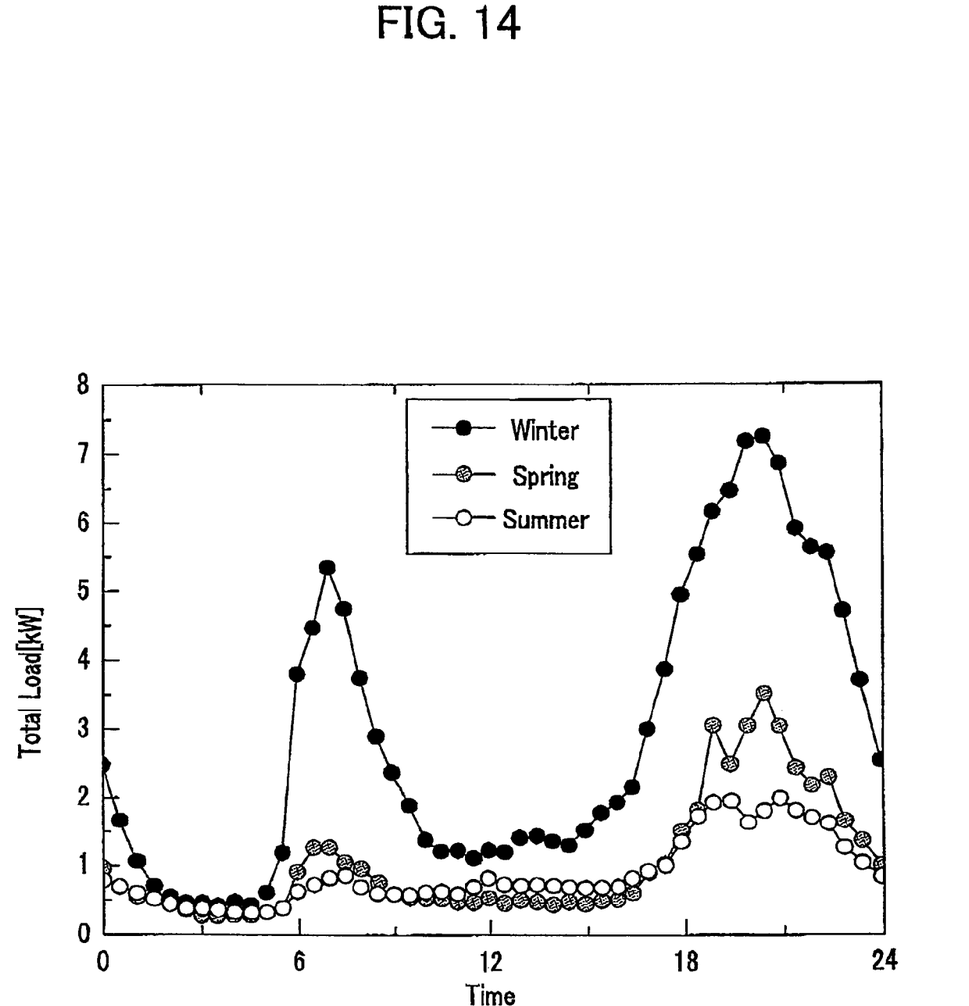
FIG. 14 is characteristic drawing showing the variation in total load in one day in a general household in each season.

A ratio of the power load to the heat load is calculated from FIG. 11 and FIG. 12, and is shown in FIG. 13 as a heat/power ratio, and FIG. 14 shows a total load adding the heat load to the power load. Is has, of course, be proven that they are greatly varied in the time zone and the seasons.

Consequently, in the cogeneration systems in the conventional techniques, it is difficult to follow the variation both in the power load and the heat load, and at this time, in the conventional techniques, the power source is driven to meet the heat load. This results in surplus power or power shortage, this in turn increase the period for conducting reverse current or power interchange within the cooperative systems, and reduces the economical merit obtainable by the cogeneration.

An object of the present invention is, therefore, to provide an engine cogeneration system, which makes it possible to follow variations both in the heat demand and power demand in an effective manner.

SUMMARY OF THE INVENTION

An object of the present invention is attained by an engine cogeneration system in which a power generator is driven a plurality of engines to supply electric power, and at the same time, exhaust heat from said plurality of engines is recovered to supply the heat to a heat load, wherein at least one of a number of engines to be driven and a combustion mode of said engine is controlled to meet heat load and power load to be demanded.

In this case, the object can be attained when said combustion mode may make a difference in heat recovered from the engine due to the alternation thereof to a power amount outputted from said power generator as heat/power ratio, alternatively, said combustion mode is any of a spark ignition combustion mode, an ignition time retard combustion mode, and a premixing compression ignition combustion mode. In the latter case, the object can be attained, in the case where said combustion mode of any of said plurality of the engines includes at least said premixing compression ignition combustion mode, when the engine is switched to said premixing compression ignition combustion mode, the switching is made under the condition that the combustion mode before switching must be said spark ignition combustion mode.

Also at least one control of a number of engines to be driven and a combustion mode of said engine is executed with the consideration that said engine including the premixing compression ignition combustion mode may be difficult to be driven at said premixing compression ignition combustion mode.

According to the present invention, since the heat/power ratio of the engine/power generator can be controlled, the variations in the heat demand and the power demand can be followed in an appropriate manner, providing an effective engine cogeneration system.

DESCRIPTION OF PREFERRED EMBODIMENTS

Referring to drawings, embodiments of an engine cogeneration system according to the present invention will now be described.

Figure 1:
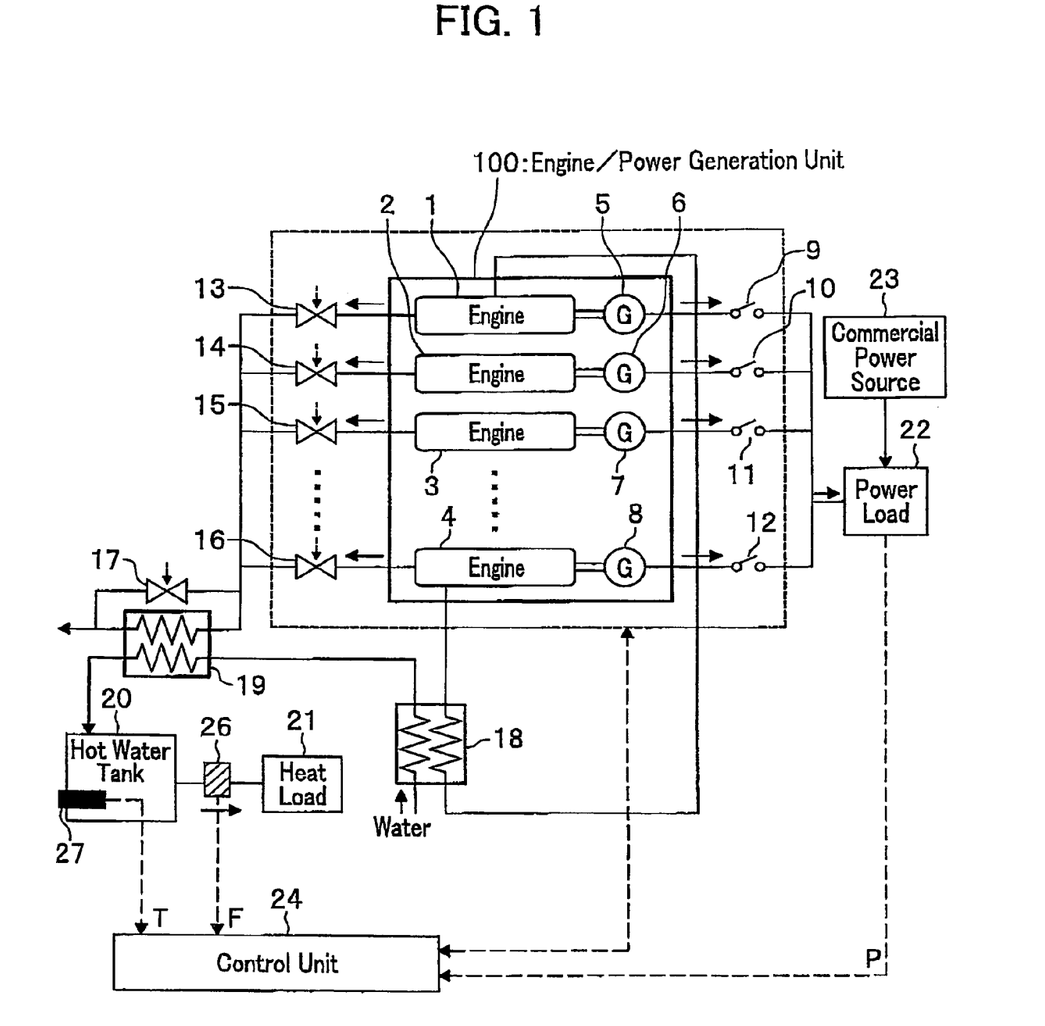
FIG. 1 is a block diagram showing an engine cogeneration system according to one embodiment of the present invention.

FIG. 1 shows one embodiment, where numeral 100 is an engine/power generator unit. The engine/power generator unit 100 is composed of a plurality of engines/power generators (four in this figure) as shown in FIG. 1, and comprises a combination of engines 1 to 4, with generators 5 to 8. For this reason, engine/power generators are expressed as engine/power generator (1-5), engine/power generator (2-6), engine/power generator (3-7), and engine/power generator (4-8).

The electric power generated by each of the power generators 5 to 8 is configured to be supplied to power load 22 comprising household electric equipments such as lights. The power P being supplied from each of the power generators 5 to 8 to the power load 22 is detected by a power meter (not shown) and is inputted to a control unit 24.

In this embodiment, it is configured that power may also be supplied from a commercial power source 23 to the power load 22 so that at emergency such of engine trouble, or at a time when it is judged operation to have no economical merit for operating the cogeneration system due to extremely small heat demand load, power is supplied from the commercial power source 23 to the power load 23.

At outputs of power generators 5 to 8, switches 9 to 12 are provided, respectively. Opening and closing of these switches 9 to 12 are controlled depending upon a number of operating the engines/power generators A to D so as to prevent countercurrent of power amongst power generators 5 to 8, which are connected to each other to parallel.

Power relays, such as so-called electromagnetic connectors, are used in these switches 9 to 12, and opening and closing thereof are controlled by the control unit 24.

Each of the engines 1 to 4 has an heat exchanger for recovering heat produced by cooling the engine, and cooling water is circulated from a cooling jacket of each of the engines. Each of exhaust pipes of the engines 1 to 4 are commonly connected to a heat exchanger 19 for recovering heat from the exhaust gas generated from each of the engines 1 to 4 via each of electromagnetic operated gas valves 13 to 16.

The electromagnetic operated gas valves 13 to 16 play a role in preventing the exhaust gas from countercurrently flowing between each of the engines, and their opening and closing are also controlled by the control unit 24 so as to open the corresponding engine only when they are operated.

The heat exchanger 19 for recovering heat from the exhaust gas has an electromagnetic operated gas valve 18 in parallel thereto, and its opening and closing are controlled by the control unit 24 so as to bypass the exhaust gas as occasion may demand.

Water flows in the heat exchanger 18 and the heat exchanger 19 to heat up the water through the heat possessed by the cooling water and by the exhaust gas to be hot water, whereby exhaust heat is recovered, making it possible to serve the exhaust heat as the cogeneration. The resulting hot water is then stored in a hot water tank 20 and may be supplied to a heat load 21 such as a hot water system or an air conditioning system.

A flow meter 26 is provided on a conduit extending from the hot water tank 20 to the heat load 21 to thereby measure a flow amount F of the hot water supplied to the heat load 21, which is inputted to the control unit 24. Also, a thermometer 27 is provided on the hot water tank 20 to thereby measure the temperature of the hot water within the hot water tank 20. This is inputted to the control unit 24 as the temperature T of the hot water to be supplied to the heat load 21.

Totally considering a heat value H and power P given from the flow amount F and the temperature T, the control unit 24 can individually and totally consider these four engines/power generators (1-5) to (4-8) of the engine/power generator unit 100.

For this reason, although not being shown in the figure, the engines/power generators (1-5) to (4-8) possess prescribed sensors such as rotation sensors, sensors for intake flow amount, and device for controlling starting and stopping of the engines and rotation number of the engines, respectively. By such a configuration, the control unit 24 can understand the situation of operation of each engine and can control the operation states required for engine including starting and stopping the engine.

In this embodiment, respective engines 1 to 4 are rotatably operated each in a plurality of different operational modes, respectively to drive the power generators 5 to 8. This is a characteristic of the present invention. The operation modes in this embodiment are three modes described herein below comprising a premixing compression ignition combustion mode MB, a spark ignition combustion mode MC, and an ignition time retard combustion mode MD.

(Premixing Compression Ignition Combustion Mode MB)

This mode is a combustion mode in a manner that a mixed gas comprising fuel and air is supplied to a cylinder, compressed by a piston to make a self-ignition. In this case, since the combustion temperature is relatively low, the heat value of the exhaust gas is small, and a high efficiency can be obtained as is.

(Spark Ignition Combustion Mode MC)

This mode is a combustion mode in a manner that a mixed gas comprising fuel air is supplied to a cylinder, compressed by a piston, and then ignited by electric spark. A general gasoline engine is applicable. Since the combustion temperature is relatively high, the heat value of the exhaust gas becomes large, but by utilizing a cogeneration system, the efficiency can be improved (80% or more).

(Ignition Time Retard Combustion Mode MD)

This mode is a combustion mode in a manner that in the spark ignition combustion mode, the ignition time is intentionally retarded to be ignited. In this case, the efficiency is of course decreased, but the temperature of the exhaust gas becomes high, making it possible to increase the heat value of the exhaust gas.

Figure 2:
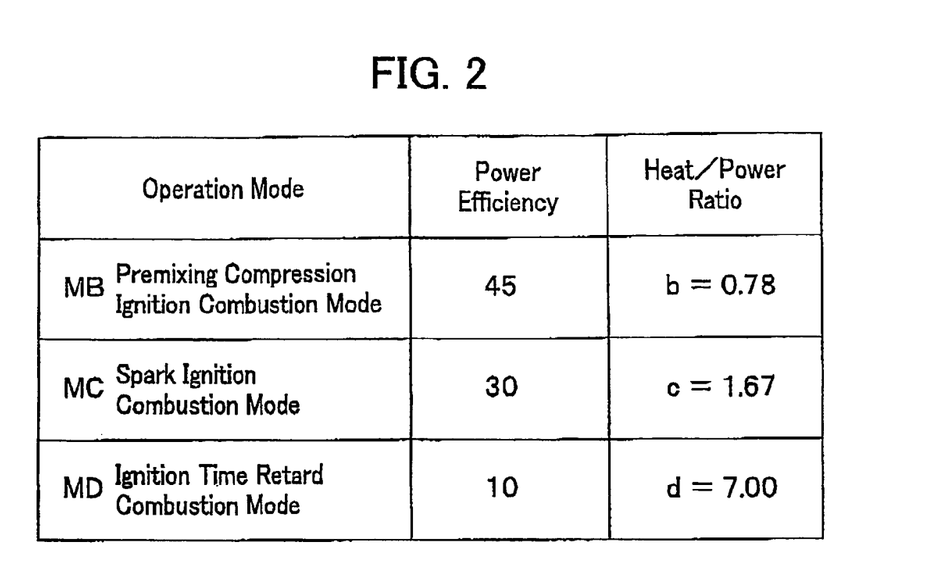
FIG. 2 explains efficiency of operation modes, power generation and heat/power ratio of the engine according to one embodiment of the present invention.

FIG. 2 shows these operation modes, power efficiency at this time, and a heat/power ratio at the time which the total efficiency of the cogeneration system is 80%. The term heat/power ratio used herein is intended to be a ratio of the power output P to the heat output H, i.e., H/P. As shown in FIG. 2, the heat/power ratio can be changed to three types heat/power ratio b (=0.78), heat/power ratio c (=1.67), and heat/power ratio d (=7.00).

Figure 3:
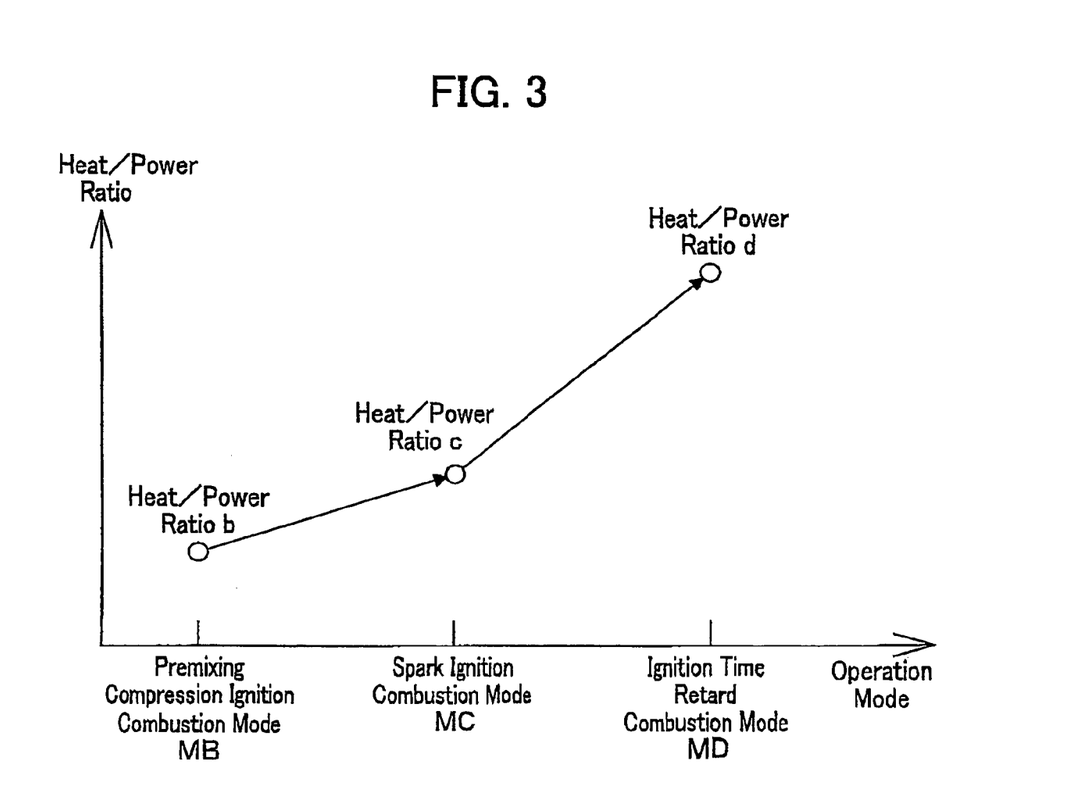
FIG. 3 is a characteristic drawing showing the operation mode and heat/power ratio in one embodiment of the present invention.

In this embodiment, as shown in FIG. 3, the heat/power ratio, H/P is controlled by types of the operation modes of the engines 1 to 4, and further controlled by a number of operating engines at each mode.

In FIG. 3, when the heat/power ratio H/P is controlled to be a value between the heat/power ratio b of the premixing compression ignition combustion mode MB and the heat/power ratio c of the spark ignition combustion mode MC, the heat/power ratio H/P is controlled by proportionally distributing a number of the engine operated at the premixing compression ignition combustion mode MB and that of the engine operated at the spark ignition combustion mode MC.

When the heat/power ratio H/P is controlled to be a value between the heat/power ratio c of the spark ignition combustion mode MC, and the heat/power ratio d of the ignition time retard combustion mode MD, the heat/power ratio H/P is controlled by proportionally distributing a number of the engine operated at the spark ignition combustion mode MC and that of the engine operated at ignition time retard combustion mode MD.

At this time, the heat/power ratio H/P is also controlled by an amount of the ignition time retard of the engine operated at the ignition time retard combustion mode MD.

The engine whose operation mode can be changed to the operation mode other than the spark ignition combustion mode MC can be realized as follows: Since the ignition time retard combustion mode MD is not required to be specifically described, because this mode can be realized only by retarding the ignition time in the spark ignition combustion mode MC.

The change into the premixing compression ignition combustion mode MB can be realized as follows, e.g. by the application of a technique so called VTEC that controls a timing of opining or closing the intake and exhaust valves and the lifting amounts, or a technique that a time of the injecting fuel and the injection amount of the fuel are precisely controlled.

Specifically, at the time of setting the mode at the premixing compression ignition combustion mode MB, the mode is once changed into the spark ignition combustion mode MC, and then a compression ratio may be increased, fuel injection may be conducted several times at one cycle, or the residual amount of the exhaust gas in the pre-exhaust cycle may be controlled by changing a timing of opining or closing the intake and exhaust valves and the lifting amounts, making it easy to realize the premixing compression ignition combustion mode MB.

Figure 4:
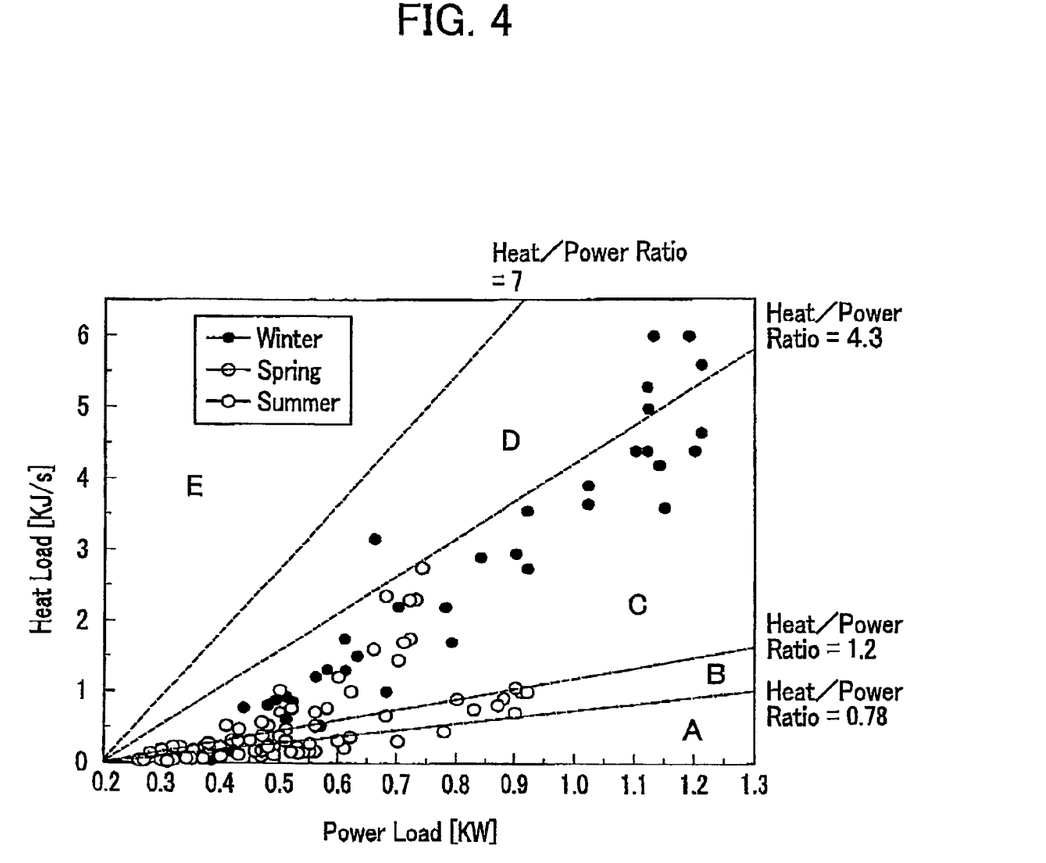
FIG. 4 an area-characteristic drawing showing the operation mode in one embodiment of the present invention.

FIG. 4 is a drawing in which heat/power ratio H/P required for operating the engines shown in FIG. 2 according to each of the operation modes corresponding to the power load in each time zone within one day shown in FIG. 11, and corresponding to the heat load in each time zone within one day shown in FIG. 12 is approximately expressed as a liner line. In this figure, the regions of from the operation mode B to the operation mode C, and of the operation mode D are the regions where the heat/power ratio can be controlled utilizing the engines having a specification as in FIG. 2, while keeping the total efficiency of 80%.

Here, the operation mode B is a mode in which a number of the engines operated at the premixing compression ignition combustion mode MB is the most, the operation mode C is a mode in which a number of the engines operated at the spark ignition combustion mode MC is the most, and the mode D is a mode in which a number of the engines operated at the ignition time retard combustion mode MD is the most.

Consequently, it can be understood from FIG. 4 that a combination of the engines having a specification as in FIG. 2 can serve the power load and heat load in a general household within a considerably wide area, and particularly that all of the load can be served in a winter season, except for the time period of from half past one to five o'clock.

Since the existing commercial power source has an efficiency of at most 40% as a primary energy, the utilization of the engine according to the present invention not only has a merit in terms of energy saving but also in a very large economical merit at the demand side.

Subsequently, the control of the engine cogeneration system shown in FIG. 1 will be described referring to a flowchart of FIG. 5. The treatments according this flowchart is gradually executed by a microcomputer accommodated within the control unit 24. For this reason, the microcomputer has a program previously stored therein, and the following specifications and conditions are also stored in a merry possessed by the microcomputer.

The sum of the power outputs and the heat output of the engines/power generator (1-5), (2-6). (3-7) and (4-8) per one unit is assumed as the rated power a.

Each of the engines 1 to 4 exists three operation modes shown in FIG. 2:

These modes are the premixing compression ignition combustion mode MB, the spark ignition combustion mode MC, and the ignition time retard combustion mode MD.

As shown in FIG. 2, the heat/power ratio at the premixing compression ignition combustion mode MB is assumed to be "b", the heat/power ratio at the spark ignition combustion mode MC to be "c", and the heat/power ratio at the ignition time retard combustion mode MD to be "d", where b<c<d.

When the operation mode is switched, the mode before being switched to the premixing compression ignition combustion mode MB must be the heat/power ratio at the spark ignition combustion mode MC.

Figure 5:
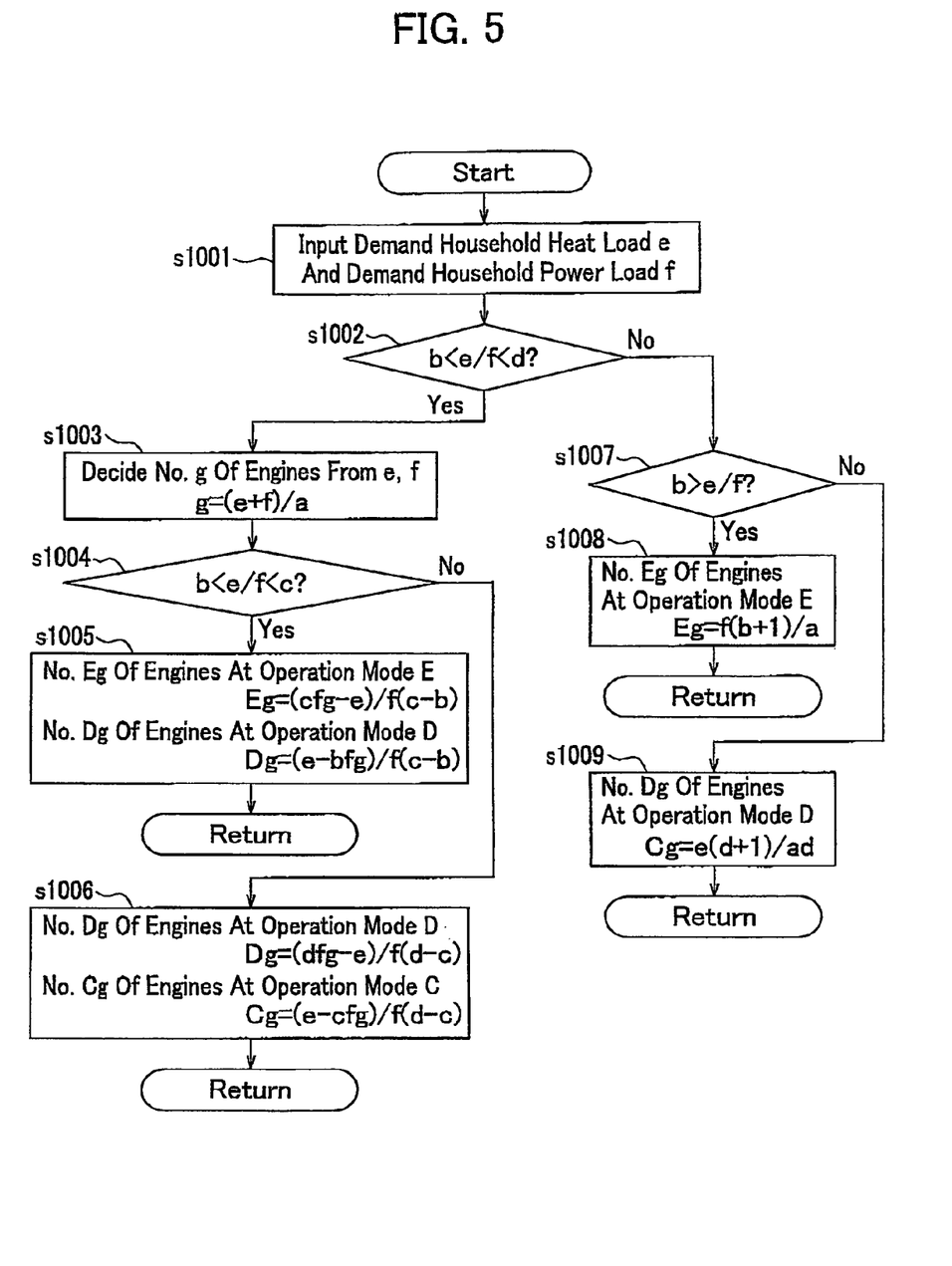
FIG. 5 is a flowchart showing the operation of one embodiment of the present invention.

Once the treatment of FIG. 5 is started, the present demand household heat load e from the heat load 21 and the demand household power load f from the power load 22 are inputted (s1001). Here the demand household heat load e is determined by the flow amount F and the temperature T described above.

Subsequently, it is examined whether or not the demand household heat/power ratio e/f is between the operation mode R and the operation mode D, i.e., whether or not b<e/f<d stands up (s1002). At this time. As shown in FIG. 2, the heat/power ratio b=0.75 and the heat/power ratio d=7.00.

When b<e/f<d stands up, a number g of the engines/power generators is decided (s1003), and then it is examined whether or not the demand household heat/power ratio e/f is between the rated heat/power ratio of the operation mode E and the operation mode D (s1004). Specifically, whether or not b<e/f<c stand up is examined. At this time, the heat/power ratio c is 1.67 as shown in FIG. 2.

If b<e/f<c stand up, it is judged that the engines/power generators at this time should be operated at any of the heat/power ratios of the operation mode E and the operation mode D. Thereafter, amongst the number g of the total operating engines, a number Eg of the engines operated at the operation mode E and a number Dg of the engines operated at the operation mode D are decided according to the following formulae (s1005). Thereafter, the step is returned to be "start".

$$Eg=(cfg-e)/f(c-b)$$

$$Dg=(e-cfg)/f(c-b)$$

Subsequently, if b<e/f<c does not stand up, and it is judged that the demand household heat/power ratio e/f is deviated from the range between the rated heat/power ratio of the operation mode E and the operation mode D, this is judged to be within the rated heat/power ratio of the operation mode D and the operation mode C. Thereafter, amongst the number g of the total operating engines, a number Dg of the engines operated at the operation mode D and a number Cg of the engines operated at the operation mode C are decided according to the following formulae (s1006). Thereafter, the step is returned to be "start".

$$Dg=(dfg-e)/f(d-c)$$

$$Cg=(e-cfg)/f(d-c)$$

At this time, as described above, in addition to or alternative to the control by distributing a number of the engine operated at the operation mode D and that of the engine operated at the operation mode C, the control may be made by a amount of the amount of the ignition time retard of the engine amongst the operation mode C.

On the other hand, if the result is NO in the step S1002, i.e., when the demand household heat/power ratio e/f is deviated from the range between the rated heat/power ratio of the operation mode E and the operation mode C, then whether or the demand household heat/power ratio e/f is lower than the heat/power ratio b of the operation mode B (s1007).

If the result is YES, i.e., b>e/f, since the heat/power ratio at this time is lower than that of the operation mode whose rated heat/power ratio is lowest amongst the engine specification, all of the engines/power generators are switched to the operation mode E, and a number Eg of the operating engine at this time is decided so as to output the demand household power load f by proportional distribution of the full output a, the demand household power load f, and the heat/power ratio b.

At this time, since the power load f is satisfied, an excess amount of heat is generated, at the time which there is a fear that the heat exceeds the heat exchange performance of the heat exchanger 19 for recovering heat from the exhaust gas generated. For this reason, the control unit 24 opens the electromagnetic operated gas valve 17 as occasion may demand to conduct a heat discharge treatment.

On the other hand, if it is judged in the treatment s 1007 to be NO, i.e., the demand household heat/power ratio e/f is larger than the heat/power ratio b of the operation mode B. At this time, the demand household heat/power ratio e/f is larger than the heat/power ratio c of the operation mode C.

In the case of this embodiment, as shown in FIG. 3, such a situation is difficult to be arisen, but in this case, all of the engines/power generators are operated at the operation mode C, and a number Cg of the operating engine at this time is decided so as to output of the demand household power load e by proportional distribution of the product of the full output a by the heat/power ratio d, the demand household power load e, and the heat/power ratio d.

At this time, since the heat/power ratio e is provided with priority, power is surpassed. For this reason, in this case, the power is reversely supplied to the commercial power source 23 so as to sell the excess power to a power supplier.

Figure 6:
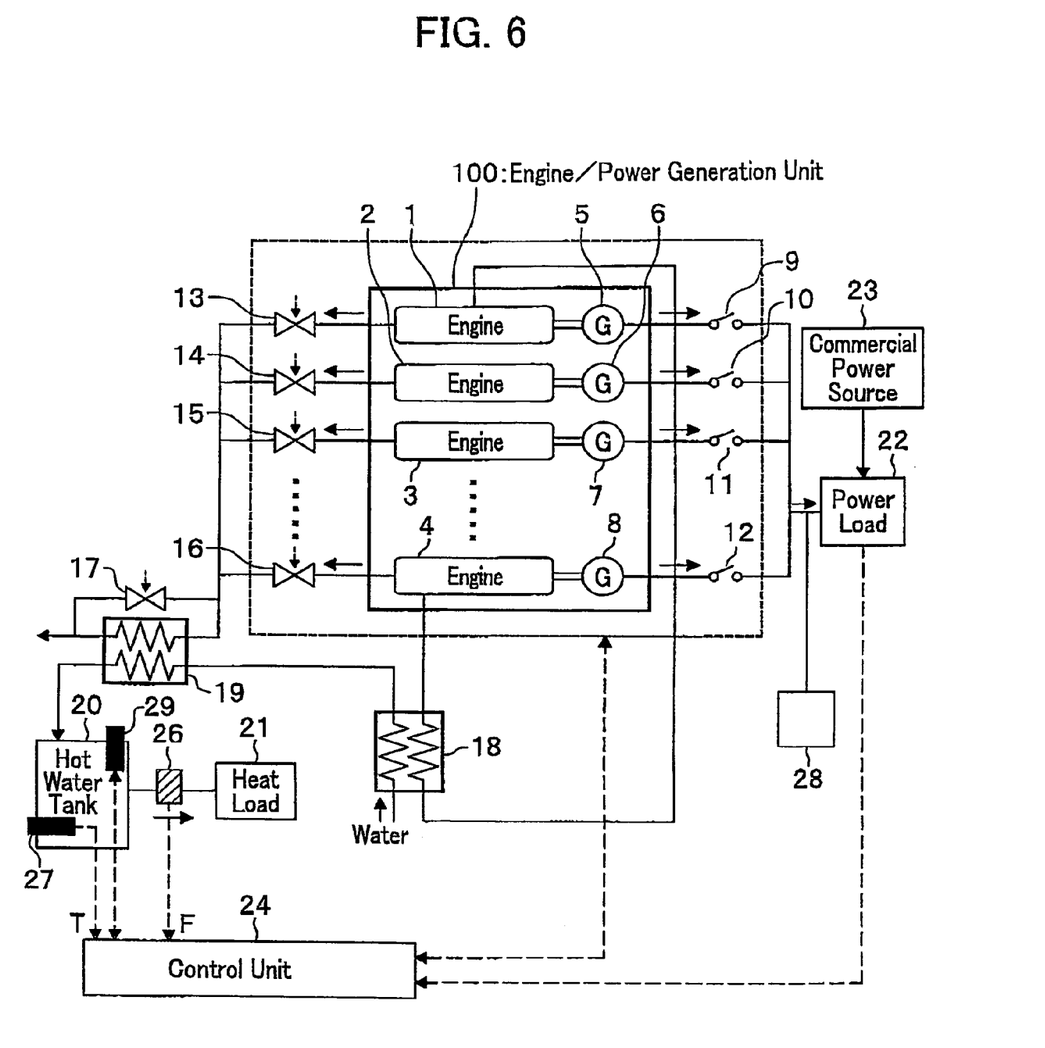
FIG. 6 is a block diagram showing an engine cogeneration system according to another embodiment of the present invention.

FIG. 6 shows another embodiment of the engine cogeneration system according to the present invention, where numerical 28 is a power storage apparatus, 29 is an electric heating apparatus, and other configurations are the same as those of the embodiment shown in FIG. 1.

The power storage apparatus 28 is composed, for example, of a secondary buttery or a capacitor for electric power and serves as storing power when it is surpassed as described above.

The electric heating apparatus 29 is composed, for example, of an electric heater such as sheathed electric wires and, as shown in the figure, it is provided on the hot water tank 20 so that when the power is surpassed, the power is converted into heat to heat up the hot water within the hot water tank 20.

According to the embodiment shown in FIG. 6, the surpass power may be not only sold but also may be stored as the system within this system or stored as hot water.

What is more, in the embodiment shown in FIG. 6, when the variation in the power load 23 is high, in addition to the control through a number of operating engines/power generators, control can be made by supplying power from the power storage apparatus 28 to the power load 28. In this case, when a capacitor for electric power, which has a high load-following up property is used as the power storage apparatus 28, high response can be provided.

Figure 7:
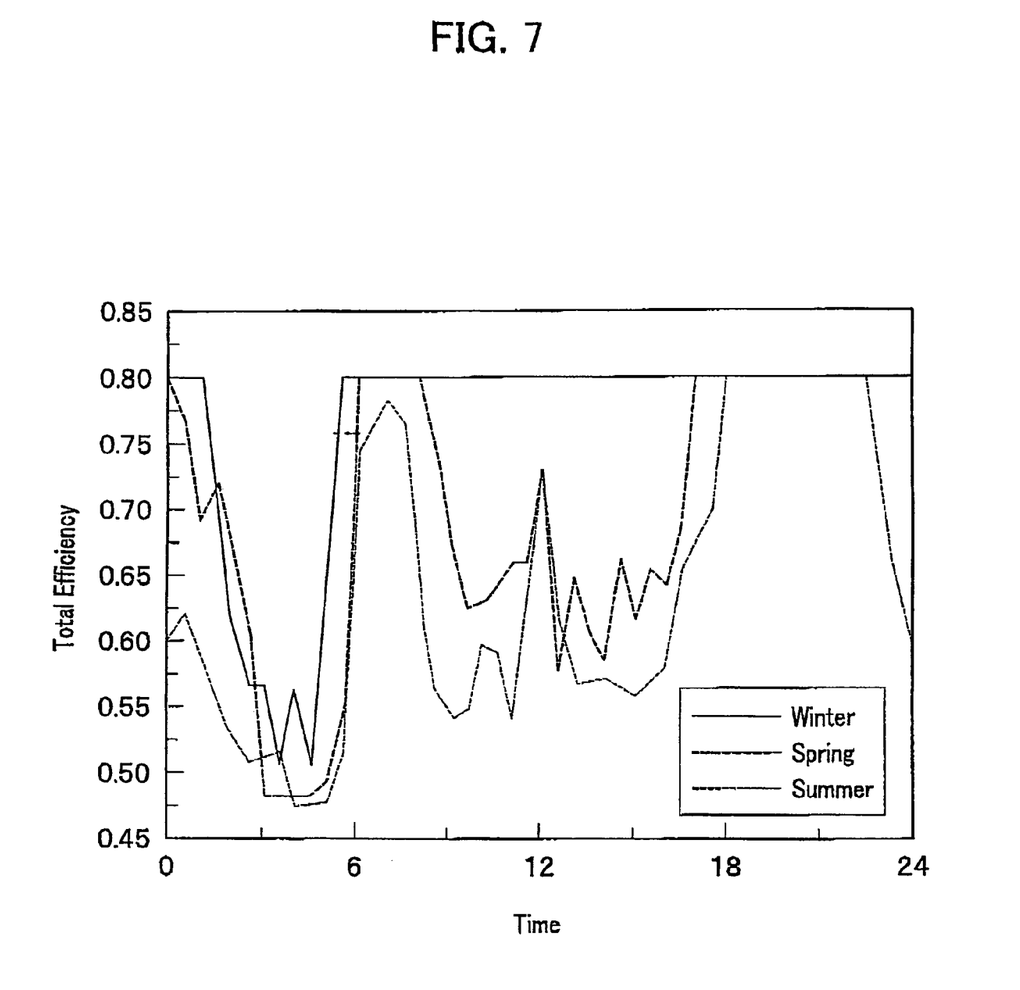
FIG. 7 is a characteristic drawing showing total efficiency according to one embodiment of the present invention.

FIG. 7 shows a total efficiency in each time when the electric load in each time over one day shown in FIG. 11 and the heat load in each time over one day shown in FIG. 12 are dealt with the engine cogeneration system shown in FIG. 1.

As is clear from FIG. 7, it can be proven that without any cooperative system, i.e., without supplying any power from the commercial power source 23, the engine cogeneration system according to this embodiment can be operated with a total efficiency of 70% on average as a primary energy over spring, summer, and winter.

In the case of this embodiment, the engines/power generators cannot be sometime operated at the operation mode E as in the case of starting up the engine, or in the case where an external temperature is too low. In this case, the engines/power generators are operated according to the flowchart shown in FIG. 8.

Figure 8:
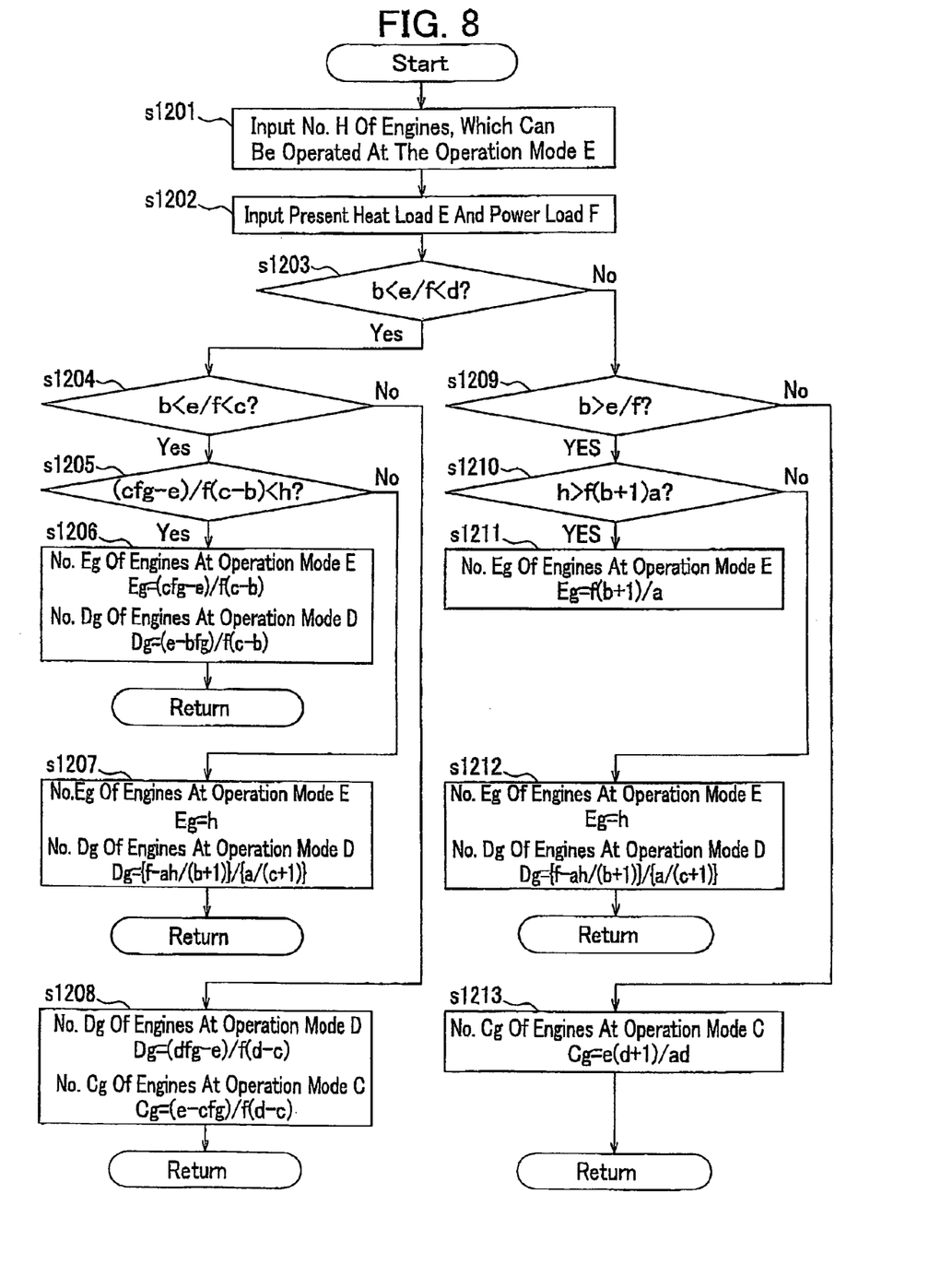
FIG. 8 is a flowchart showing the operation of a cogeneration system according to yet another embodiment of the present invention.

The treatments shown in FIG. 8 are also executed by a microcomputer, which is the control unit 24, according to a program stored in the microcomputer. When the treatments are started, first a number h of the engines, which can be operated at the operation mode E, is understood in a treatment s1201. The judgment whether or not the engine can be operated at the operation mode E is determined the state of warming up the engine by the temperature of the wall surface of the combustion chamber or such.

Subsequently, the number "h" of the engines, which can be operated at the operation mode E is inputted, and then the demand household heat load e and the power load f are inputted in the treatment 1202. Thereafter, in the treatment 1203, whether or not the demand household heat/power ratio e/f is within the rated heat/power ratios between the operation mode E and the operation mode C is judged.

If the result of the judgment in the treatment is "YES", whether or not the operation at the operation mode E is required is judged in the next treatment s1204. Then, if the operation at the operation mode E is judged to be required, the number "h" of the engines, which can be operated at the operation mode E is compared with the number (e−cfg)/f (b−c) of the engines required for operating at the operation mode E in the next treatment s1204.

If the number (e−cfg)/f(b−c) of the engines required for operating at the operation mode E is larger than the number "h", in the next treatment s1207, control is made so that the amount of the power arisen form the fact that the engine or engines cannot be operated at the operation mode E is compensated by increasing the number of the engines operated at the operation mode D.

At this time, the number of the engine operated at the operation mode E is decided as the number "h" of the engines, which can be operated at the operation mode E. Also, the number of the engine operated at the operation mode D is decided as an amount of the power obtained by subtracting the demand power load f from the amount of the power generated at the time of operating the h engines at the operation mode E, i.e., $\{(f-ah)/(b+1)\}$.

At this time, because the power supply has a priority, an excess heat relative to the demand heat load e is generated. For this reason, while monitoring the situation of the hot water within the hot water tank 20, the electromagnetic operated gas valve 17 is operated so as to bypass the exhaust gas for a exhaust heat treatment as occasion may demand.

On the other hand, if the demand household heat/power ratio e/f is judged to be deviated from the rated heat/power ratio in the treatment s1203, then whether or not the operation at the operation mode E is required is judged in the next treatment s1209. In this case, the condition is b>e/f.

If the result is "YES", then the number "h" of the engines, which can be operated at the operation mode E is compared with the number "(b+1)/a of the engines operated at the operation mode E required for the demand household power load f in the next treatment s1210.

If the number "h" of the engines, which can be operated at the operation mode E is larger than the number "(b+1)/a of the engines required, then the number of the engines operated at the operation mode E is decided in the next treatment s1211. On the other hand, if the number "h" of the engines, which can be operated at the operation mode E is smaller than the number "(b+1)/a of the engines required, then the amount of the demand household power load f which can not supplied from the engines operated at the operation mode E is compensated by increasing the number of the engines operated at the operation mode D.

At this time, since an excess heat relative to the demand heat load e is generated, while monitoring the situation of the hot water within the hot water tank 20, the electromagnetic operated gas valve 17 is operated so as to bypass the exhaust gas for a exhaust heat treatment as occasion may demand.

On the other hand, in the treatment s1207 and the treatment s1212, the amount of the power load $\{f-ha/(b+1)\}$, which cannot be supplied by the operation of the engines operated at the operation mode E may be supplied from the power storage apparatus 28 or the commercial power source 23.

Figure 9:
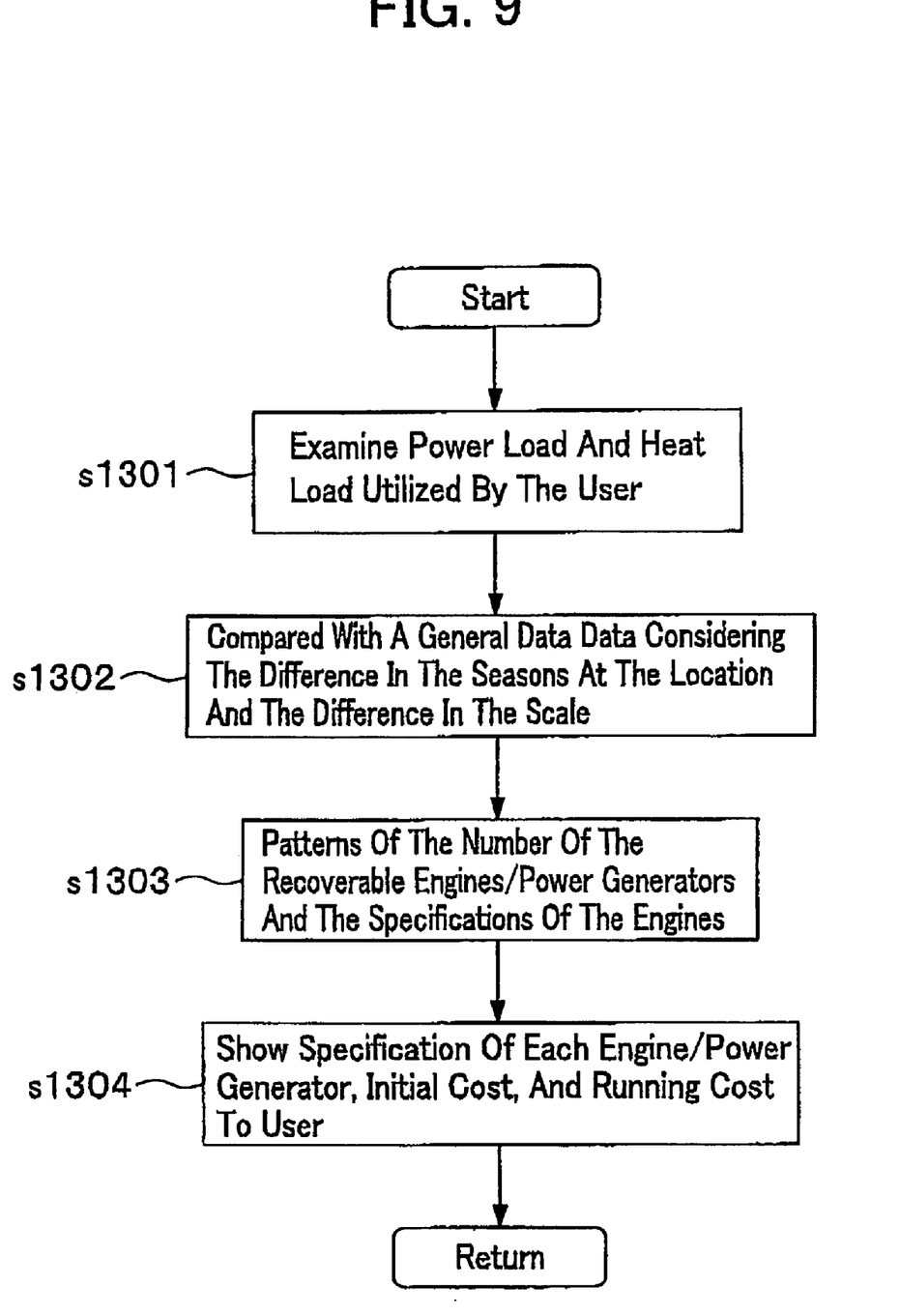
FIG. 9 is a flowchart showing one example of the procedure when a use porches the engine cogeneration system according to the present invention.

Here, referring to the flowchart of FIG. 9, the protocol where a user buys the engine cogeneration system according to the present invention will be described.

First, the power load and the heat load normally utilized by the user are examined (s1301), then the result of the examination is compared with a general power load data and heat load data considering the difference in the seasons at the location and the difference in the scale (s1302), several patterns of the number of the engines/power generators and the specifications of the engines are prepared (s1303), and economical merits every patterns having been prepared are shown to the user concerned (s1304).

The user decide the specification of the engine cogeneration system to be bought and the number of the engines based on the data shown.

Figure 10:
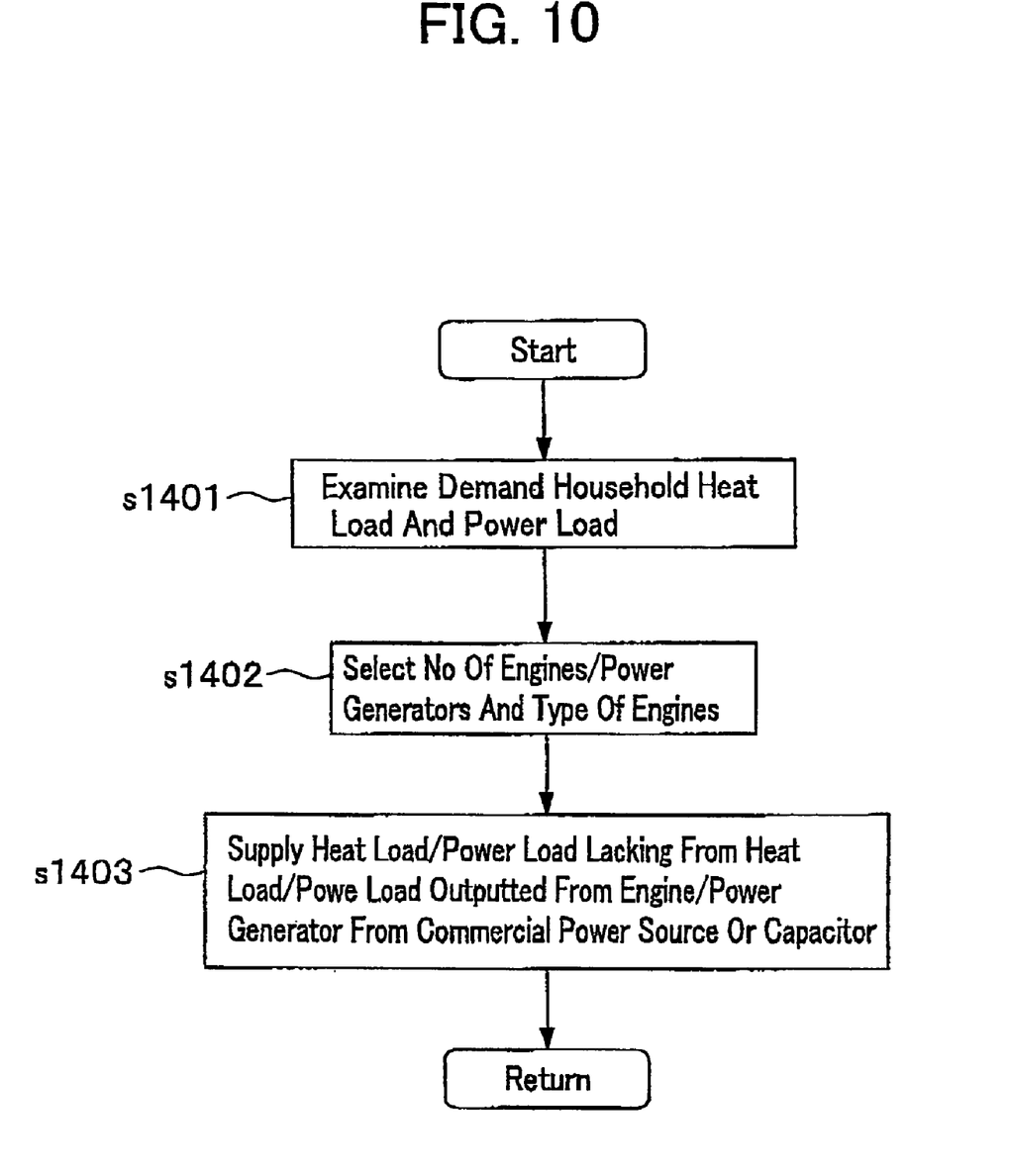
FIG. 10 is a flowchart showing the operation of another embodiment of the present invention.

Next, how to control the engine cogeneration system in the embodiment of FIG. 1 where the combustion modes are fixed, and the engines can only be operated at mutually different modes will be described with reference to the flowchart of FIG. 10.

First, the demand household heat load 3 and power load f are examined from the results of the measurement of the flow meter 26 and the thermometer 27 (s1401). Then, the number of the engines/power generators and which types of the engines having a prescribed mode should be operated are determined based on the demand household heat load 3 and power load just examined (s1402). Thereafter, amounts of loads smaller than the demand household heat load 3 and power load f are supplied from the commercial power source 23 or the power storage apparatus 28 such as a capacitor.

According to the embodiments described above, which controls the heat-power ratio, heat and power can be supplied in a high efficiency by the cogeneration system.

What is claimed is:

1. An engine cogeneration system in which at least one power generator is driven by a plurality of engines to supply electric power, and at the same time, at least one of exhaust heat and one coolant heat from said plurality of engines is recovered to supply the heat to a heat load, wherein a combustion mode of at least one of the plurality of engines is controlled to meet a demanded heat load and power load,
   wherein said combustion mode makes a difference in heat recovered from the engine due to the alternation thereof to a power amount outputted from said power generator as heat/power ratio.

2. The engine cogeneration system according to claim 1, wherein the combustion mode is any of a spark ignition combustion mode, a retard of spark ignition combustion mode, and a homogeneous charge compression and ignition combustion mode.

3. The engine cogeneration system according to claim 1, wherein the combustion mode is any of a spark ignition combustion mode, a retard of spark ignition combustion mode, and a homogeneous charge compression and ignition combustion mode, and
   wherein in the case where said combustion mode of any of said plurality of the engines includes at least said homogeneous charge compression and ignition combustion mode, when the engine is switched to said homogeneous charge compression and ignition combustion mode, the switching is made under the condition that the combustion mode before switching must be said spark ignition combustion mode.

4. The engine cogeneration system according to claim 1, wherein the combustion mode is any of a spark ignition combustion mode, a retard of spark ignition combustion mode, and a homogeneous charge compression and ignition combustion mode; and
   wherein at least one control of a number of engines to be driven and a combustion mode of said engine is executed with the consideration that said engine including the homogeneous charge compression and ignition combustion mode is difficult to be driven at said homogeneous charge compression and ignition combustion mode.

* * * * *